United States Patent [19]

Vanderveen

[11] 3,998,934
[45] Dec. 21, 1976

[54] PRODUCTION OF CARBON BLACK

[75] Inventor: John W. Vanderveen, Bartlesville, Okla.

[73] Assignee: Phillips Petroleum Company, Bartlesville, Okla.

[22] Filed: July 3, 1974

[21] Appl. No.: 485,421

[52] U.S. Cl. .............................. 423/455; 423/450; 423/456
[51] Int. Cl.$^2$ .......................................... C01C 1/50
[58] Field of Search .......... 423/450, 455, 456, 457; 23/259.5

[56] References Cited
UNITED STATES PATENTS

| | | | |
|---|---|---|---|
| 2,672,402 | 3/1954 | Stokes | 423/450 |
| 3,369,870 | 2/1968 | Ganz et al. | 423/450 |
| 3,438,732 | 4/1969 | Morel | 23/259.5 X |
| 3,615,213 | 10/1971 | Shepherd | 423/450 |
| 3,642,446 | 2/1972 | Heller et al. | 423/455 |

*Primary Examiner*—Edward J. Meros

[57] ABSTRACT

Carbon black is produced in a generally cylindrical reactor in which a hydrocarbon feed oil is introduced at one end generally along the axis of the reactor. A gaseous fuel and oxygen are introduced in directions generally parallel to the axis of the reactor to surround the feed oil. Inert gases are introduced into the reactor to surround the central core. Properties of the carbon black can be regulated by introducing the oxygen at a relatively high velocity and adjusting the rate at which the inert gases are introduced.

5 Claims, 3 Drawing Figures

PRODUCTION OF CARBON BLACK

It is common practice to produce carbon black by furnace processes wherein a hydrocarbon feed oil is heated to an elevated temperature which serves to decompose the oil to produce carbon black. In most operations of this type the reaction products are quenched, such as by a stream of water, to terminate the reaction. The gases and carbon black withdrawn from the reactor are separated to recover carbon black. Processes of this type require extensive filtering equipment to remove carbon black from the relatively large volume of effluent gases.

In accordance with this invention, an improved carbon black process is provided wherein substantial quantities of the effluent gas from the reactor can be recirculated to the reactor. This greatly reduces the filtration requirements and results in a process which is relatively inexpensive to operate. A stream of hydrocarbon feed oil is introduced along the axis of a generally cylindrical reaction zone. Streams of oxygen and fuel gas are introduced to surround the fuel oil so that the resulting combustion products supply heat to decompose the fuel oil. Relatively cool gases, which can be substantially inert, are introduced into the reactor to surround the central zone. These relatively cool gases serve to quench the reaction products. The effluent gases from the reactor are passed to a separation zone, which can be a simple cyclone separator. The offgases from the separator, which may contain appreciable amounts of carbon black, can be recycled to the reactor to form the gases which surround the core. Because of this recycle feature, it is not necessary to provide extensive filtering of the offgases.

The oxygen stream is introduced into the reactor at a relatively high rate with respect to the rates at which the oil and fuel are introduced. By operating in this manner, the properties of the carbon black produced can be varied by changing the velocity at which he relatively inert gases are introduced into the reactor. This provides a simple method for controlling the properties of the black.

In the accompanying drawing.

Figure 1:
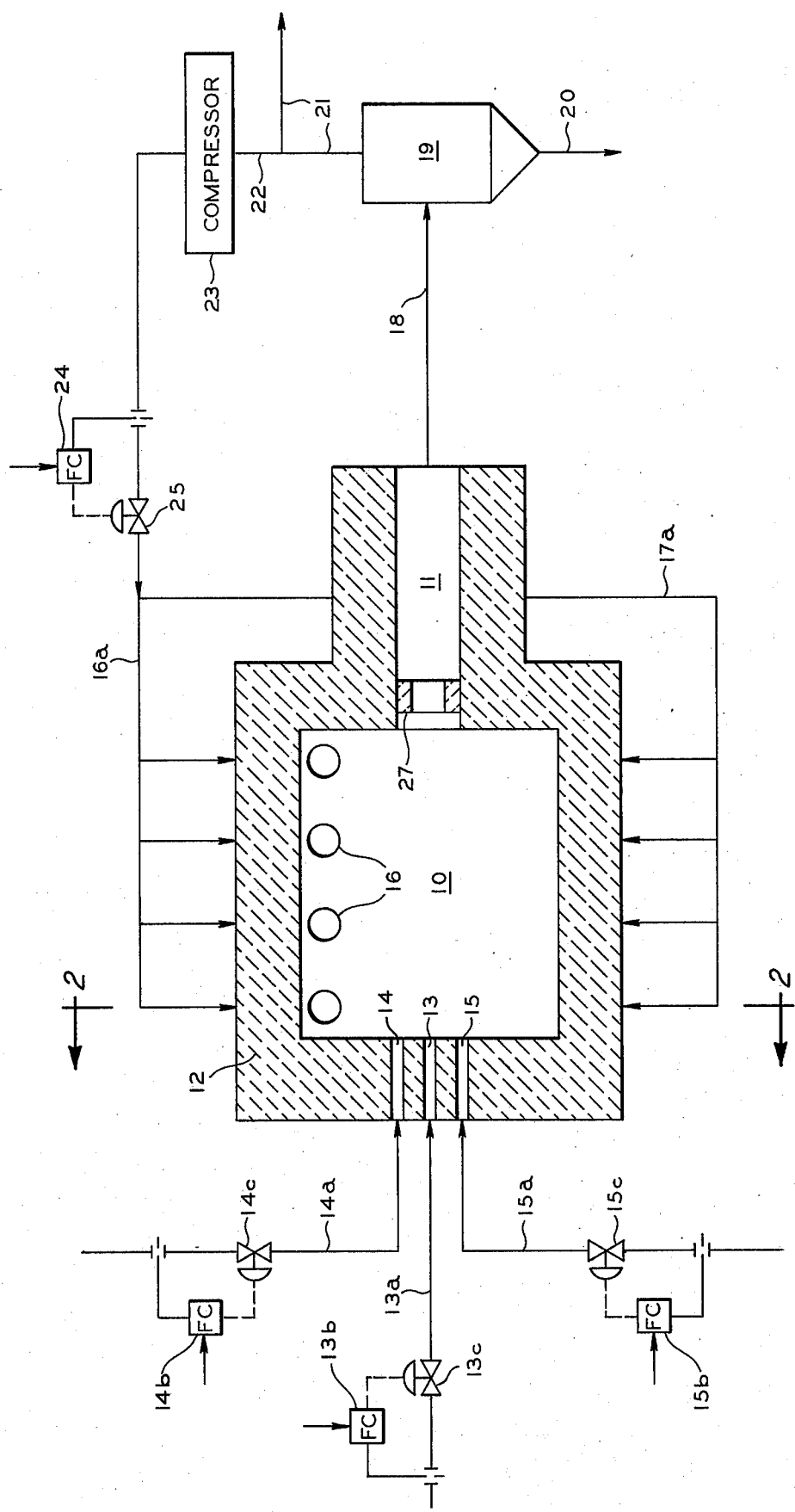
FIG. 1 is a schematic representation of apparatus which can be employed to carry out the method of this invention.
Figure 2:
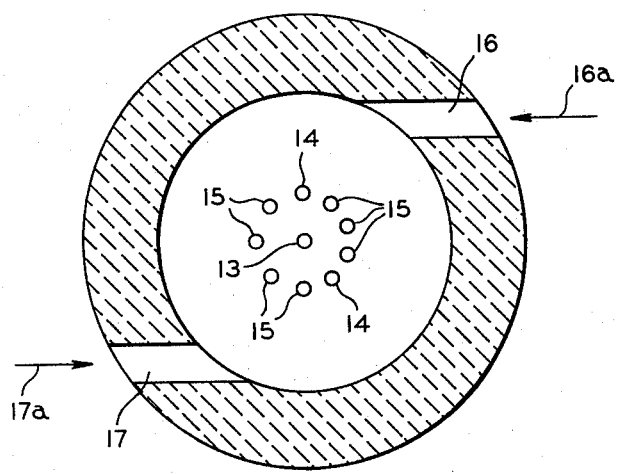
FIG. 2 is a view taken along line 2—2 in FIG. 1.

Referring now to the drawing in detail and to FIGS. 1 and 2 in particular, there is shown a generally cylindrical combustion chamber 10. A generally cylindrical reaction chamber 11 communicates with zone 10 and is coaxial therewith. Chambers 10 and 11 are surrounded by a mass of ceramic insulating material 12. In order to simplify the drawing, a single layer of insulating material has been illustrated. However, in actual practice the insulation normally comprises two or more layers of ceramic which can be surrounded by a metal shell. The reactor is provided with a first inlet 13 which extends into one end of chamber 10 generally along the axis of the zone. Inlet 13 is surrounded by a plurality of inlets 14 and 15. In the specific embodiment illustrated, there are two inlets 14 and seven inlets 15. A hydrocarbon feed oil is introduced through a conduit 13a which communicates with inlet 13. Any conventional oil for use in furnace process carbon black production can be used. Suitable oils are described in U.S. Pat. Nos. 2,865,717 and 3,235,334, for example. The rate of flow of oil through conduit 13a can be regulated by a flow controller 13b which adjusts a valve 13c. An oxygen-containing stream, which can be pure oxygen, air or air enriched with oxygen, is introduced through a conduit 14a which communicates with inlets 14. The rate of flow through conduit 14a can be regulated by a flow controller 14b which adjusts a valve 14c. A fuel, which advantageously is a light hydrocarbon such as natural gas, butane or propane, is introduced through a conduit 15a which communicates with openings 15. The rate of flow of fuel is regulated by a flow controller 15b which adjusts a valve 15c. The reactor is also provided with a plurality of inlets 16 and 17 which extend into chamber 10 in directions generally tangential to the wall of the chamber. Streams of relatively inert gas are introduced through inlets 16 and 17 from respective conduits 16a and 17a.

The effluent from chamber 11 is directed through a conduit 18 to the inlet of a separator 19, which can be a cyclone separator. Carbon black is withdrawn from the bottom of separator 19 through a conduit 20, and gases are withdrawn from the top of separator 19 through a conduit 21. A conduit 22, which can have a compressor 23 therein, communicates between conduit 21 and conduits 16a and 17a. The rate of flow of gases through conduit 22 can be regulated by a flow controller 24 which adjusts a valve 25. In normal operation, a major portion of the gases removed from separator 19 are recycled through conduit 22. Any remaining gases can be passed to additional filtering facilities or to a flare. If desired, a choke 27 can be positioned within chamber 11 to increase turbulence and facilitate mixing of the combustion gases.

In accordance with this invention, oxygen is introduced through openings 14 at a velocity which is higher than the velocities at which the oil and fuel are introduced through respective openings 13 and 15. The oxygen velocity is in the range of about 70 to 200 feet per second, whereas the oil and fuel are introduced at velocities of about 20 to 50 feet per second. The gases introduced through openings 16 and 17 are at velocities of about 50 to 250 feet per second. The ratio of oxygen to fuel should be in the stoichiometric range of about 0.8:1 to about 2.5:1. The ratio of oxygen to hydrocarbon feed should be from about 60:1 to 600:1 (standard cubic feet per gallon). It is preferred that relatively pure oxygen be introduced through openings 14, although air or enriched air can also be used. The foregoing ratios are based on the oxygen content of the stream introduced through openings 14. The actual number of openings 14 and 15 can vary from the number illustrated. For reasons of economy, the offgases from separator 19 are introduced through openings 16 and 17. However, any other source of relatively inert gases, such as nitrogen, can be employed if desired.

A number of runs were conducted to demonstrate the process of this invention. These runs were conducted in a cylindrical reactor of the configuration shown in FIG. 1 except that no choke 27 was employed. Chamber 10 was 10 inches in diameter and 10 inches long. Chamber 11 was 2 inches in diameter. Openings 14, 15, 16 and 17 were tubes ¼ inch in diameter; and opening 13 was a water-cooled tube ⅛ inch in diameter. Nitrogen at room temperature was introduced through openings 16 and 17. The hydrocarbon feed was benzene, the fuel was methane, and the oxygen-containing stream was oxygen. The runs were conducted to produce carbon black having a photelometer reading above 70, which is usually a requirement for commercial carbon black. The operating conditions and properties of the produced carbon blacks were as follows:

| Run No. | Tangential Gas[a] | | Feed[a] | | Fuel[a] | | Oxygen[a] | | Carbon Black Properties | | |
|---|---|---|---|---|---|---|---|---|---|---|---|
| | SCF/Min. | Ft./Sec. | cc/Min. | Ft./Sec. | SCF/Min. | Ft./Sec. | SCF/Min. | Ft./Sec. | Iodine No.[b] | Photelometer[c] | 24M4DBP[d] |
| 1 | 10.40 | 200 | 9.0 | 24 | 0.6 | 16.5 | 1.10 | 100 | 290 | 100 | 104 |
| 2 | 9.30 | 180 | 9.0 | 24 | 0.6 | 16.5 | 1.10 | 100 | 240 | 93 | 101 |
| 3 | 8.15 | 158 | 9.0 | 24 | 0.6 | 16.5 | 1.10 | 100 | 217.5 | 95 | 101 |
| 4 | 8.50 | 163 | 9.0 | 24 | 0.6 | 16.5 | 1.10 | 100 | 220 | 100 | 101 |
| 5 | 7.10 | 135 | 9.0 | 24 | 0.6 | 16.5 | 1.10 | 100 | 206 | 97 | 101 |
| 6 | 6.70 | 128 | 9.0 | 24 | 0.6 | 16.5 | 1.10 | 100 | 190 | 100 | 100 |
| 7 | 5.75 | 111 | 9.0 | 24 | 0.6 | 16.5 | 1.10 | 100 | 197.5 | 100 | 104 |
| 8 | 5.50 | 106 | 9.0 | 24 | 0.6 | 16.5 | 1.10 | 100 | 96 | 98 | 96 |
| 9 | 5.00 | 96 | 9.0 | 24 | 0.6 | 16.5 | 1.10 | 100 | 104 | 93 | 104 |
| 10 | 4.50 | 86 | 9.0 | 24 | 0.6 | 16.5 | 1.10 | 100 | 106 | 82 | 106 |
| 11 | 5.75 | 111 | 9.0 | 24 | 0.6 | 16.5 | 1.10 | 100 | 110 | 94 | 110 |
| 12 | 3.90 | 75 | 9.0 | 24 | 0.6 | 16.5 | 1.10 | 100 | 104 | 71 | 104 |
| 13 | 10.40 | 200 | 9.0 | 24 | 0.6 | 58 | 1.10 | 31 | 90 | 94 | 94 |
| 14 | 9.30 | 180 | 9.0 | 24 | 0.6 | 58 | 1.10 | 31 | 82.6 | 97 | 95 |
| 15 | 8.15 | 158 | 9.0 | 24 | 0.6 | 58 | 1.10 | 31 | 82.6 | 100 | 95 |
| 16 | 7.50 | 145 | 9.0 | 24 | 0.6 | 58 | 1.10 | 31 | 95 | 97 | 96 |
| 17 | 7.10 | 135 | 9.0 | 24 | 0.6 | 58 | 1.10 | 31 | 105 | 100 | 96 |

[a]SCF/Min. is flow rate expressed in standard cubic feet per minute, and Ft./Sec. is velocity. In Runs 1 to 12, oxygen was introduced through two openings and methane was introduced through seven openings. In Runs 13 to 17, this was reversed.
[b]ASTM D1618-58T, mg/gm.
[c]ASTM D1618-58T.
[d]U.S. Patent 3,548,454, as measured after crushing by Method B, ASTM D2414-70, cc/100 gm.

Figure 3:
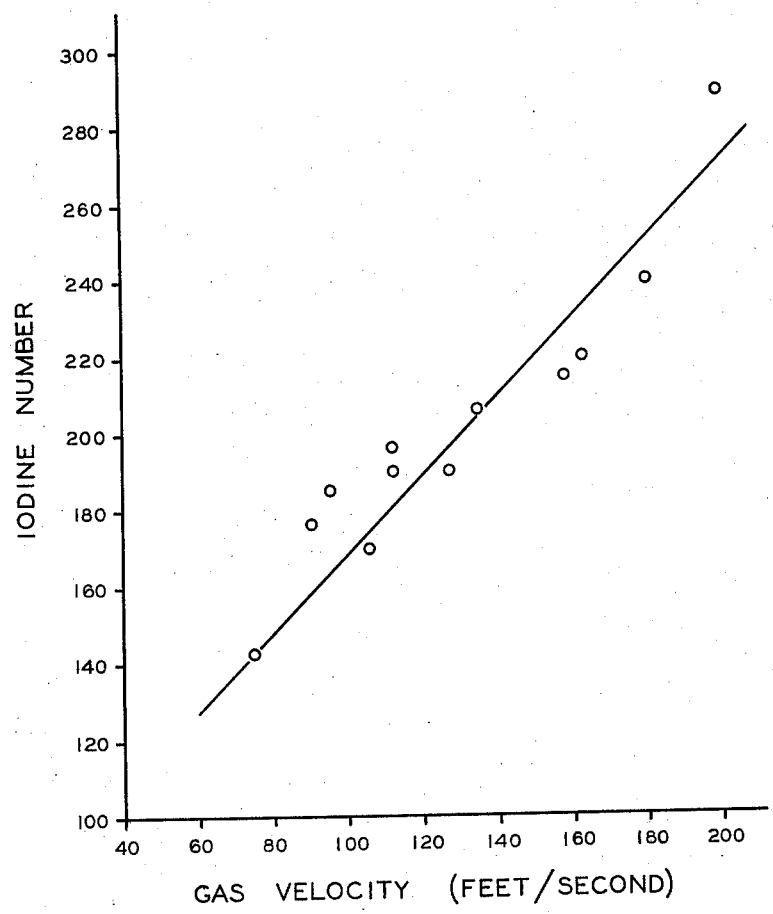
FIG. 3 is a graphical representation of the carbon black control feature of the invention.

Runs 1 to 12 demonstrate that there is a substantially linear relationship between the Iodine No. of the produced carbon black and the velocity at which the tangential gases are introduced when the oxygen is introduced at a relatively high velocity (100 feet per second). This is shown in FIG. 3 wherein the relationship is illustrated graphically. Runs 13 to 17 demonstrate that there is no such relationship when the oxygen is introduced at a relatively low velocity (31 feet per second). By introducing the oxygen at a high velocity, the Iodine No. of the black can be changed as desired merely by changing the velocity at which the tangential gas is introduced. This can be regulated in the apparatus of FIG. 1 by changing the set point of flow controller 24.

While this invention has been described in conjunction with presently preferred embodiments, it obviously is not limited thereto.

What is claimed is:
1. A method of producing carbon black which comprises:
   introducing a feed oil into a generally cylindrical combustion zone in a direction generally along the axis of the combustion zone and at a velocity in the range of about 20 to 50 feet per second;
   introducing a gaseous fuel into the combustion zone adjacent the feed oil and generally parallel thereto, said fuel being introduced at a velocity in the range of about 20 to 50 feet per second;
   introducing a free oxygen-containing gas into the combustion zone adjacent the feed oil and generally parallel thereto to support combustion of the fuel, said free oxygen-containing gas being introduced at a velocity in the range of about 70 to 200 feet per second, the ratio of oxygen to fuel being in the stoichiometric range of about 0.8:1 to about 2.5:1, and the ratio of oxygen to feed oil being in the range of about 60:1 to about 600:1 standard cubic feet per gallon;
   introducing inert gas into said combustion zone adjacent the side wall thereof to surround the central region of the combustion zone, said inert gas being relatively cool to quench the reaction products;
   passing the effluent from said combustion zone into a reaction zone; and
   withdrawing carbon black and gases from the reaction zone.
2. The method of claim 1 wherein said inert gas is introduced generally tangential to the side wall of said combustion zone at a velocity in the range of about 50 to 250 feet per second.
3. The method of claim 1 wherein the carbon black and gases withdrawn from the combustion zone are passed to a separation zone wherein carbon black is removed from the gases, and wherein gases removed from the separation zone are returned to the combustion zone as inert gas.
4. The method of claim 1 wherein said reaction zone is generally cylindrical, is of smaller diameter than said combustion zone, and is positioned coaxial with said combustion zone.
5. The method of claim 4 wherein said reaction zone has a constriction at the inlet thereof to increase turbulence.

* * * * *